United States Patent [19]
Goodhill

[11] Patent Number: 5,841,512
[45] Date of Patent: Nov. 24, 1998

[54] METHODS OF PREVIEWING AND EDITING MOTION PICTURES

[76] Inventor: Dean Kenneth Goodhill, 8942 Wonderland Park Ave., Los Angeles, Calif. 90046

[21] Appl. No.: 607,791

[22] Filed: Feb. 27, 1996

[51] Int. Cl.⁶ .................................................. G03B 31/00
[52] U.S. Cl. .............................. 352/56; 352/129; 348/441
[58] Field of Search ................................... 352/5, 12, 85, 352/123, 129, 29, 44, 180, 168, 27, 184; 360/13; 348/97, 182, 722, 441; 386/4

[56] References Cited

U.S. PATENT DOCUMENTS

| | | | |
|---|---|---|---|
| 1,318,610 | 10/1919 | Sereinsky | 352/241 |
| 1,835,743 | 12/1931 | Aster | 352/5 |
| 1,921,494 | 8/1933 | Wildhaber | 352/5 |
| 1,999,754 | 4/1935 | Evans | 352/27 |
| 2,079,572 | 5/1937 | Kiel | 352/5 |
| 3,285,087 | 11/1966 | Wells | 74/330 |
| 3,565,521 | 2/1971 | Butler et al. | 352/163 |
| 3,617,626 | 11/1971 | Bluth et al. | 348/182 |
| 3,819,258 | 6/1974 | Butler et al. | 352/163 |
| 3,865,738 | 2/1975 | Lente | 352/44 |
| 4,105,311 | 8/1978 | Boudouris | 352/187 |
| 4,678,298 | 7/1987 | Perisic | 352/62 |
| 4,697,896 | 10/1987 | Fox | 352/180 |
| 4,893,921 | 1/1990 | Beauviala | 352/180 |
| 4,900,293 | 2/1990 | McLendon | 352/241 |
| 5,312,304 | 5/1994 | Vetter | 352/241 |
| 5,341,182 | 8/1994 | Schmidt | 352/184 |
| 5,506,639 | 4/1996 | Frazen et al. | 352/31 |
| 5,534,954 | 7/1996 | Vetter | 352/29 |
| 5,537,157 | 7/1996 | Washino et al. | 348/722 |
| 5,537,165 | 7/1996 | Miyamori et al. | 352/27 |
| 5,539,527 | 7/1996 | Kajimoto et al. | 358/335 |
| 5,543,869 | 8/1996 | Vetter | 352/184 |
| 5,594,552 | 1/1997 | Fujinami et al. | 386/131 |
| 5,617,218 | 4/1997 | Rhodes | 348/441 |

OTHER PUBLICATIONS

"Too Costly for Prime Time", *Los Angeles Times* Mar. 22, 1992.
Editing a Whirlwind for 'Christmas' : , *Daily Variety Special Report* Mar. 16, 1992.
"Electronic Editing with Dean Goodhill", *Editors Guild Newsletter* (Winter 1992).
"You Want a Whole Movie by When?", *Calendar* (undated).
Advertisement for New Clairmont Super 1.85 (undated).
"Three–Perf Technology: Tomorrow's Film Format—Today", *International Photographer* (Oct. 1987).
"Step Printers", Optical Printers, etc. (circa 1950).
"Film Pulldown Mechanism Based on a Design by Samuel B. Grimson", *SMPTE,* vol. 67.
"The Radial–Tooth, Variable–Pitch Sprocket", *SMPTE,* vol. 57.

*Primary Examiner*—D. Rutledge
*Attorney, Agent, or Firm*—Knobbe, Martens, Olson & Bear, LLP

[57] ABSTRACT

The invention provides improved methods for editing film into motion pictures. Visual images are transferred from developed motion picture film to a high definition video storage medium, which is a storage medium adapted to store images and to display images in conjunction with display equipment having a scan density substantially greater than that of an NTSC compatible video storage medium and associated display equipment. The visual images are also transferred, either from the motion picture film or the high definition video storage medium to a digital data storage format adapted for use with digital nonlinear motion picture editing equipment. After the visual images have been transferred to the high definition video storage medium, the digital nonlinear motion picture editing equipment is used to generate an edit decision list, to which the motion picture film is then conformed. The high definition video storage medium will be adapted to store and display visual images having a scan density of at least 550 horizontal line, preferably at least 800 horizontal lines, and most preferably 1000 horizontal lines. Electronic or optical transformations may be utilized to allow use of visual aspect ratios that make full use of the storage formats used in the method.

16 Claims, 5 Drawing Sheets

METHODS OF PREVIEWING AND EDITING MOTION PICTURES

BACKGROUND OF THE INVENTION

Film—Still the Medium of Choice for Motion Pictures

The first crude motion pictures were produced and exhibited a little more than one hundred years ago. In the following century, motion pictures swept the globe, bringing information and entertainment to vast audiences the world over. Currently, motion pictures are exhibited theatrically, transmitted by television, cable, and satellite, and packaged as magnetic videotapes, laser discs, and soon, via DVD digital disks. The near future is sure to see the development of other as yet undeveloped motion picture distribution systems such as "video on demand," new electronic storage media, and advanced "multimedia" presentation packages.

No matter what format they ultimately appear in, the vast majority of motion pictures still originate in the same medium as that first supplied by George Eastman in September of 1889—a 1 and ⅜ inch wide strip of film coated with a light-sensitive emulsion. Although the art is much-advanced, the most basic step of motion picture film-making is little changed. A long strip of film wound onto a roll is loaded into a camera, the camera is pointed at the action, the film is drawn through the camera intermittently at a rate of 24 frames per second, and light from the action is focused inside the camera onto the film. This produces a "latent image" on the film negative. The film negative is developed, printed, and edited to create the finished motion picture.

Over the past century, film has been an astonishingly effective medium for storing moving visual images. Indeed, motion pictures and "movies" were for a long time virtually synonymous with film. More recently some motion pictures, especially those intended for television, have been shot on a relatively new electronic storage medium—videotape. Efforts are ongoing to devise and improve advanced digital media for electronic storage of moving images. Though some of the most advanced digital electronic storage media used for special effects approach the clarity, resolution, and color capabilities of state of the art motion picture film stock, the cost of storing and duplicating such images for distribution in digital form is commercially prohibitive. Although the capabilities of electronic storage media are certain to advance, film is likely to retain its technical, practical, and economic advantages for some considerable time. Thus, film should remain the medium of choice for motion picture makers for at least at least the immediately foreseeable future.

Editing—Where Film Becomes Entertainment

The first motion picture audiences were astonished and delighted by simple moving images—a galloping horse or a train rolling down a track. But filmmakers and audiences quickly outgrew these simple novelty strips. Film rapidly evolved into a recognized dramatic art form as motion picture makers developed their techniques and added humor, suspense, characterization, dramatization, and narrative structure to their films. Where the earliest motion pictures were of a single, simple scene shot on one camera in a single take, the newer motion pictures were much more complex. Motion pictures soon included dozens or hundreds of scenes, each shot with multiple camera setups. Film directors and editors strung together film clips selected from multiple shots and repeated takes to assemble their new artistic visions. Out of the masses of film that was shot and printed, the early directors and editors painstakingly selected just the right segments. These bits were physically cut and spliced together to form the completed work. Selecting and assembling individual shots into a completed motion picture is referred to as "editing" the film.

Early Methods and Equipment for Editing Film

Figure 1:
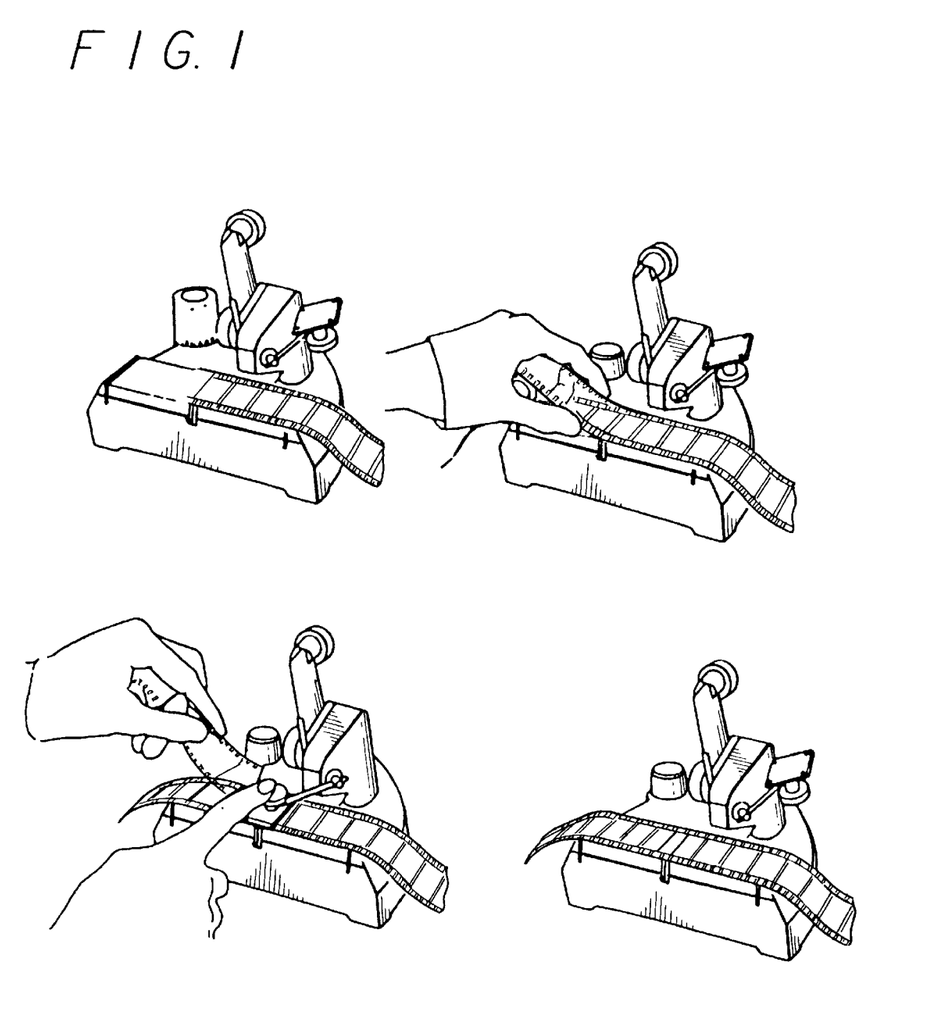
FIG. 1 illustrates a conventional method for cutting and splicing film.

For many years editors selected, edited, and joined strips of film by slicing unwanted frames out of the film and hot splicing or taping selected strips together. Over time, this developed into a creative enterprise in its own right, with editors exercising their own artistic judgments along with the directors to assemble the film. FIG. 1 illustrates the physical steps of cutting and splicing film with clear perforated tape.

Figure 2:
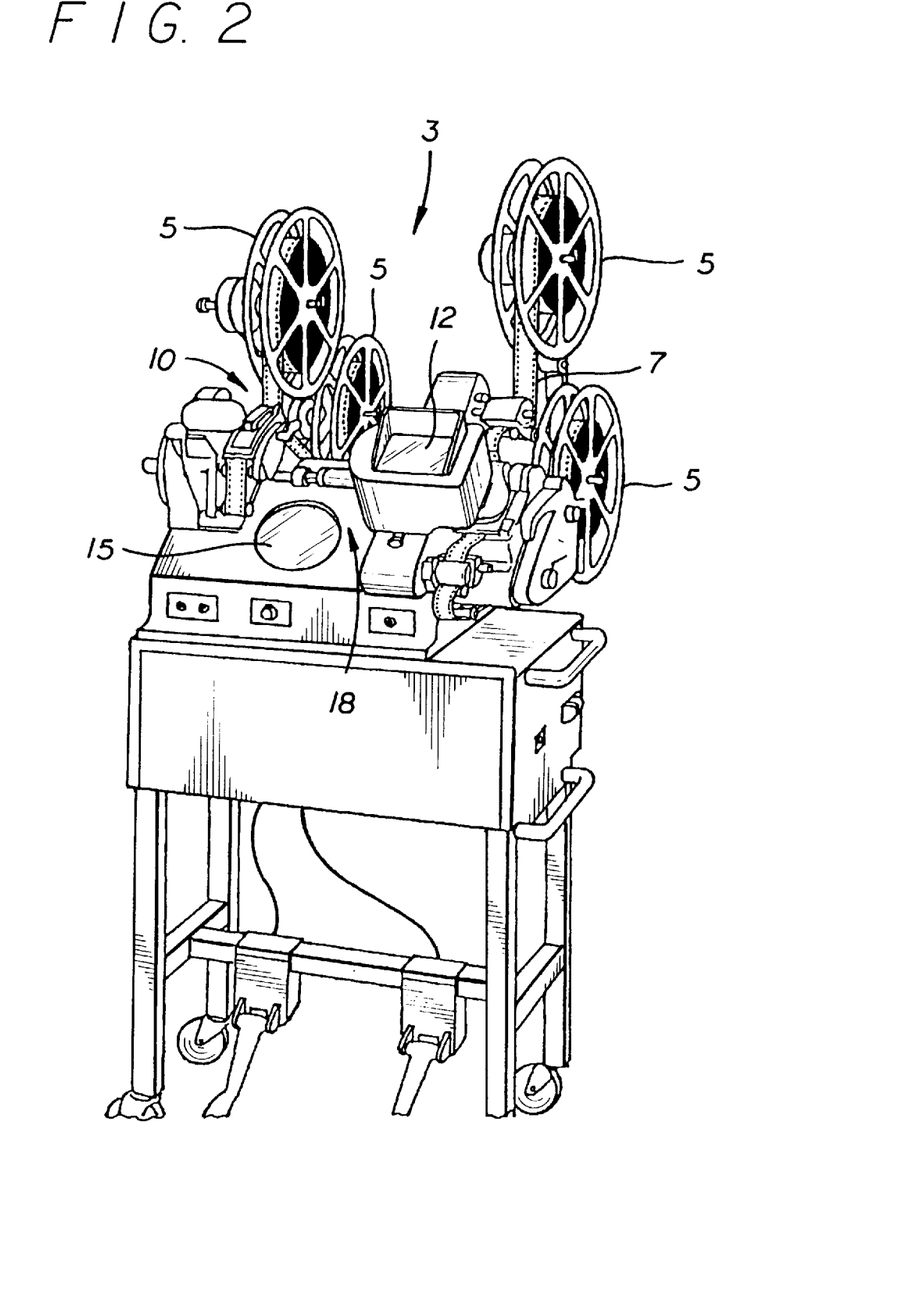
FIG. 2 depicts a prior art "Moviola" film viewer.

Specialized equipment soon developed to help editors in their task. The venerable "Moviola" was invented in 1924. FIG. 2 depicts a Moviola film viewing tool 3. This editing tool developed to include separate reels 5 for workprint 7 and sound "track" 10. The equipment included a rear projection screen 12 and a speaker 15 for playing the film and track as they passed through the machine. The workprint and sound track could be seen or heard separately or synchronized and locked together with a sliding mechanical sleeve 18. This equipment allowed the editor to see and hear the picture and sound together as he assembled the film.

Figure 3:
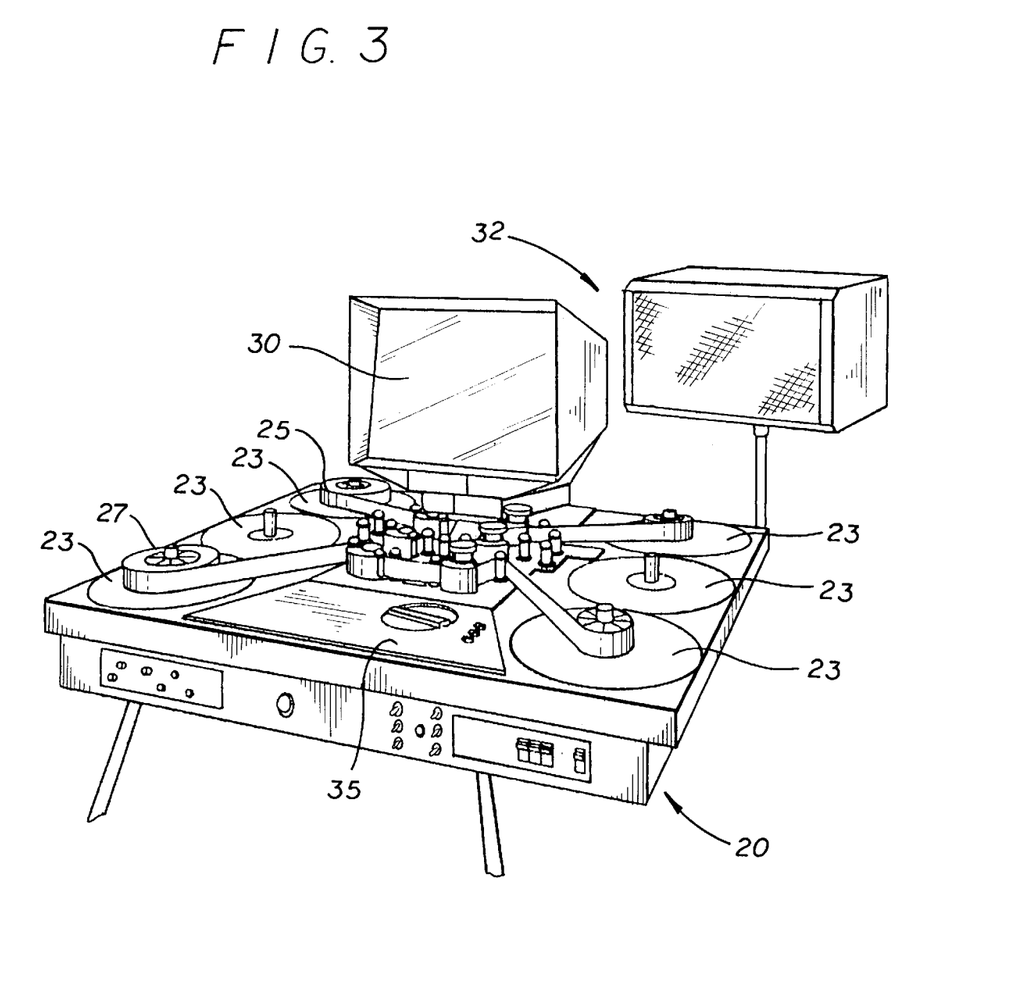
FIG. 3 shows a prior art "KEM"-type "flat bed" editing table.

Later equipment had the same features. FIG. 3 depicts a "KEM"-type "flatbed" film viewing table 20. Like the Moviola, the KEM table had separate reels 23 for workprint 25 and sound track 27, a projection screen 30 and a speaker 32. In place of a sliding sleeve, the editor could operate electromechanical switches 35 to synchronize and lock the picture and sound together. With either system, the motion picture was still edited manually by cutting and splicing together selected pieces of workprint and audio track.

Preview Audiences Help to Shape a Film

Directors and editors assemble the film according to their own artistic judgments. Directors and editors also rely on input and assistance from others. Directors and editors often choose to show one or more early versions of the film to a preview audience before the film is finalized. The filmmakers gauge the reaction of the preview audience and based on this reaction the filmmakers may make further changes to the film. The preview audience is sometimes as few as one person, e.g., the director, the producer, an investor, or a film company executive. The preview audience can also be many more people, e.g., a theater-sized preview audience specially recruited and assembled to view the film. The audience may communicate its reactions to the film, e.g., by spontaneous reaction, by verbal comments, or by responses to carefully worded survey questions. Filmmakers and others observe and record the verbal and non-verbal responses of preview audiences.

The filmmakers carefully consider the reactions of the preview audience to the film. They may then make minor or extensive revisions based on their assessment of the audience reaction. They may then show the revised version to the same or a different preview audience to judge the reaction to the new version. This cycle of preview, assessment, and revision may continue through many versions of the evolving film. Major motion pictures for theatrical release are typically previewed several or even dozens of times.

The older methods of editing by physically slicing and joining selected strips of positive workprint were advantageous in that the most recent version of the film was always available to show to a preview audience. The filmmakers would simply take the version of the film in whatever condition it was in and show that version to the preview audience. Further revisions were made directly to that film, and the most recent version was thus always available.

Although advantageous in that an edited, projectable positive workprint was always available for preview, the traditional methods were clumsy and inefficient in other ways. For example, it was sometimes difficult and time-consuming for the editor to locate the desired footage on the reels of workprint and track. Much time was spent spooling back and forth through the film to find the exact locations desired.

Newer Methods and Equipment for Editing Film

Beginning in the last several years, digital nonlinear motion picture editing systems have become increasingly dominant in film editing. To use one of these systems, picture film is first exposed (and sometimes printed) and sound is recorded as before. Then, the picture and sound are transferred from the developed negative (or workprint) and sound track onto magnetic tape in a process called "telecine." The picture information is typically recorded onto magnetic tape in a standard NTSC format, which is the same as that used in the United States for broadcast television. The NTSC format includes some 525 horizontal scan lines measured across the screen. Although the NTSC format offers nowhere near the resolution of film, and would not generally be acceptable for projection to theatrical audiences, the format is generally regarded as acceptable for use in the editing process.

The digitized picture and sound information is typically stored on high-capacity magnetic disk drives or other high-capacity storage media. This conversion may be performed with equipment manufactured, e.g., by Avid or by Lightworks. This equipment includes video display and sound playback apparatus, a great deal of digital memory and storage, and a computer interface by which the editor can operate the equipment to edit the film in progress. The equipment stores the picture and sound information as a set of computer files which hold the individual frames of the picture and the recorded sound in digitized form. The individual picture frames are referenced and stored in the database according to time codes that refer in turn to key codes printed on the film. The sound can be referenced by time codes, which are keyed to the original sound master, and sometimes also by code numbers applied by assistants to correlate picture and track.

As before, the editor selects the shots that will make up the completed film and decides in which order the shots will appear. Instead of physically cutting and splicing workprint and track, however, the editor uses the computer interface to tell the equipment in what order the shots should be played. The digital nonlinear editing equipment can quickly retrieve and play all or part of any shot in any order. In effect, the equipment keeps in its memory an electronic list of time codes that refer to the frames of the picture and sound and the order in which they appear. This equipment is very convenient and allows the editor great flexibility in composing the film. Instead of cutting and splicing frames into the film, picture can be added to or removed from the work simply by modifying the list stored in the equipment's memory.

When the editor is satisfied that the film is complete, the editor uses the equipment to generate an "edit decision list," a table of codes that describes exactly which frames of the picture and track are to appear in the completed work and in what order. When the edit decision list is finalized, a person known as the "negative cutter" takes the edit decision list and "conforms" the original negative to the edit decision list by physically cutting and splicing together pieces of the negative in the order specified in the edit decision list. The final edit decision list is also referred to as a "negative cutting list." At the same time, sound editors use a sound edit decision list to conform production sound masters to the creative choices made by the editor, director, and others. The production sound is mixed with various other sound elements to create the final "dub," which is then aligned with the final cut picture to construct the final, finished composite (picture and sound) version. Multiple copy negatives are manufactured from the final composite and the copy negatives are then used to produce the hundreds or thousands of composite prints for exhibition at motion picture theaters and for transfer to the various video formats currently in use.

The newer electronic methods of nonlinear film editing are much more quick, convenient, and flexible than the older methods. As a result, the new methods have quickly become dominant in the industry. A significant disadvantage resides, however, in the difficulty and expense involved in preparing workprint for big screen exhibition and in producing interim versions of the work for exhibition to preview audiences.

Filmmakers, actors, executives, and others involved in the production first see and hear their work in progress as raw unedited "dailies." Dailies screenings usually take place every day after photography is complete and provide the filmmakers with their first opportunities to form creative responses to the material they are then shooting. Although editors and directors can view dailies on their editing equipment or on standard NTSC video monitors, it is generally believed that great creative value resides in seeing the footage "on the big screen," in a form that approximates the presentation that will ultimately be seen by theater audiences.

Because the new nonlinear film editing methods do not require workprint and work track, printing picture dailies and transferring sound to 35 mm work track adds steps to the filmmaking process that would not otherwise be necessary. In addition, cutting, conforming, and assembling workprint and track for previews is difficult, time-consuming, and expensive. When the older editing methods were used, dailies were easily available because workprint was needed to edit the film. Moreover, cutting and assembling previews did not add significantly to the overall cost of the motion picture because cut film was naturally available as an inherent product of the traditional editing process. However, actual film is not ordinarily cut during digital nonlinear editing. As described above, the editor works from a digital database to compose an edit decision list specifying the order in which images and sound from the database are to appear in the film. Workprint is unnecessary for the actual editing process.

If an interim version of the film is needed for exhibition to a preview audience, the editor must generate an interim edit decision list. Workprint printed from the original negative must then be cut and assembled in conformance with this interim list. Sometimes, sound is also conformed and mixed according to an interim sound edit decision list, or else it may be taken directly from the nonlinear editing equipment. The expense of preparing conformed interim workprint can greatly increase the cost of the project, and filmmakers sometimes elect to forego the expense of preparing these prints for preview.

In that case, one can still prepare a preview version of lesser quality by using the information stored in the digital nonlinear editing equipment to generate a preview on NTSC compatible videotape or a similar low definition format. This videotape can then be played on standard equipment. This is sometimes minimally acceptable for some purposes, e.g., screening dailies or exhibiting an interim version of the film for a limited preview audience. However, a significant part of a film's impact on the audience resides in the richness and size of the projected image. Much of this impact can be lost with video in an NTSC compatible or similar format. It is generally much more satisfying to see a major motion picture projected onto a cinema screen than it is to watch that same work on even a large screen television. Moreover, NTSC and similar formats use a 1.33:1 "aspect ratio" (the ratio of the image width to height), which is suitable for television but inappropriate for theatrical images, which are typically intended for projection in 1.85:1 or 2.35:1 aspect ratios. NTSC compatible and similar low definition interim versions of the film are therefore generally unacceptable for big screen projection to preview audiences.

For larger budget projects, filmmakers often elect to spend the extra money to have interim versions cut from workprint to show as previews. For these projects, the added expense is believed justified. However, this choice typically adds at least tens and often hundreds of thousands of United States dollars to the cost of a major theatrical release. This is a substantial expense even for big budget projects, and one which can cut significantly into the profitability of the motion picture.

A definite need exists, therefore, for new and improved methods for editing motion pictures. The new methods should continue to take advantage of the flexibility and convenience of the newest digital nonlinear editing systems, but should also provide convenient and less expensive methods for viewing dailies and for preparing interim versions of the edited film in a high quality format acceptable for exhibition to all types of preview audiences on theatrical sized screens when desired.

SUMMARY OF THE INVENTION

The invention provides improved methods for editing film into motion pictures. According to the invention, visual images are transferred from developed motion picture film to a high definition video storage medium, which is a storage medium adapted to store images and to display images in conjunction with display equipment having a scan density substantially greater than that of an NTSC compatible video storage medium and associated display equipment. The visual images are also transferred, either from the motion picture film or the high definition video storage medium to a digital data storage format adapted for use with digital nonlinear motion picture editing equipment. After the visual images have been transferred to the digital data storage format the digital nonlinear motion picture editing equipment is used to generate an edit decision list, to which the motion picture film is then conformed. Methods according to the invention are thus advantageous in that the visual images are available for preview exhibition from the high definition video storage medium while still allowing the motion picture to be edited on the digital nonlinear motion picture editing equipment.

In methods according to the invention, the high definition video storage medium will be adapted to store and display visual images having a scan density of at least 550 horizontal line, preferably at least 800 horizontal lines, and most preferably 1000 horizontal lines. The visual images will typically be transferred to the digital data storage format and stored on at least one high-capacity magnetic disk drive adapted for use with the digital nonlinear motion picture editing equipment. The visual images will often be transferred to a low definition video storage medium as an intermediate step to transferring the visual images to the digital data storage format. Often, an interim edit decision list will be generated, and the visual images conformed to this interim list on the high definition video storage medium, prior to conforming the motion picture film to the final edit decision list. Some methods according to the invention will include electronic or optical transformations to allow the use of visual aspect ratios that make full use of the storage formats used in the method. In such methods, the aspect ratio of the images may be transformed to a different aspect ratio before the images are stored on the high definition video storage medium and transformed back to the original aspect ratio before the images are displayed.

Thus, the invention provides convenient and economical methods for editing film into finished motion pictures. These new methods utilize all of the advantages of the newest digital nonlinear motion picture editing equipment while still providing means for convenient and inexpensive viewing of dailies and preparing interim versions of the motion picture for exhibition to preview audiences. Other features and advantages of the present invention will become apparent from the following detailed description of the preferred embodiment, taken in conjunction with the accompanying drawings, which illustrate by way of example the principles of the invention.

DESCRIPTION OF THE PREFERRED EMBODIMENTS

Figure 4:
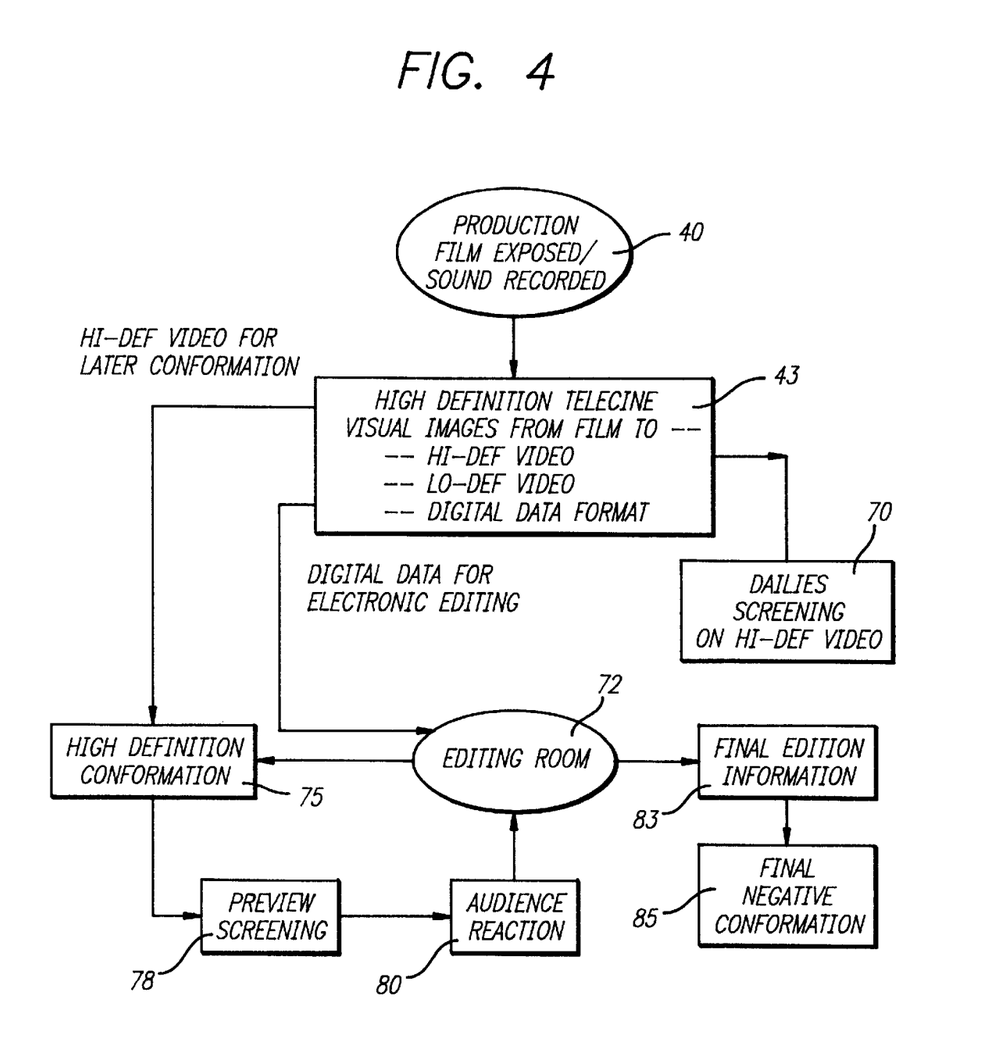
FIG. 4 is a schematic illustration showing the flow of information through various processes of a method embodying the invention.

The invention provides new and improved methods for editing film into motion pictures. FIG. 4 illustrates schematically the flow of information through various processes of a method embodying the invention.

In the new method, shooting takes place as before in "production" 40. In production, picture film is exposed and sound is recorded, typically onto high quality audiotape. During filming, each scene will typically be shot several times from various positions, often with several cameras simultaneously. All or part of the resulting negative is then developed and made available for editing and inclusion in the motion picture.

As film is exposed and developed, and sound recorded, the developed negative and sound masters are taken into "high definition telecine" 43. In high definition telecine, images from the developed negative are transferred to other video storage media with formats better adapted for viewing and editing the work in progress. In methods according to the invention, images from the film negative, or alternatively, from a workprint made from the negative, are scanned in high definition telecine and thereby transformed into an electronic signal which is then stored on a high definition video storage medium. In this document, the term "high definition video storage medium" refers to any medium adapted to store and display video images having a scan density substantially greater than that of NTSC compatible video display equipment and associated storage media. The term should be taken to include, without limitation, high definition videotape and other media adapted for use with the recently developed "16×9" video storage format, which is adapted to store and display images having over 1100 horizontal lines, similar formats now in commercial development, and other high definition formats that may be developed in the future, such as the recently proposed 2:1 aspect ratio with progressive (non-interlaced) display. High definition video storage media suitable for use with the invention will be adapted to store visual images having at least 550 horizontal lines, more often at least 800 horizontal lines, and preferably at least 1000 horizontal lines.

Also in telecine, visual images are transferred from the film negative, a workprint, or from the high definition video storage format onto a low definition video storage medium. The term "low definition video storage medium" refers to a medium adapted to store and display video images having a scan density approximately equal to or less than NTSC compatible video display equipment. For reference, NTSC compatible formats are adapted to store and display images having only about 525 horizontal lines.

Finally, visual images are converted from the film negative, a workprint, the high definition video storage medium, or the low definition video storage medium and stored into a digital data storage format adapted for use with digital nonlinear motion picture editing equipment. The various format transfers described above may occur simultaneously with one another, or in any sequence. The sound information may also be transferred between formats in any order that the filmmakers find useful.

Figure 5:
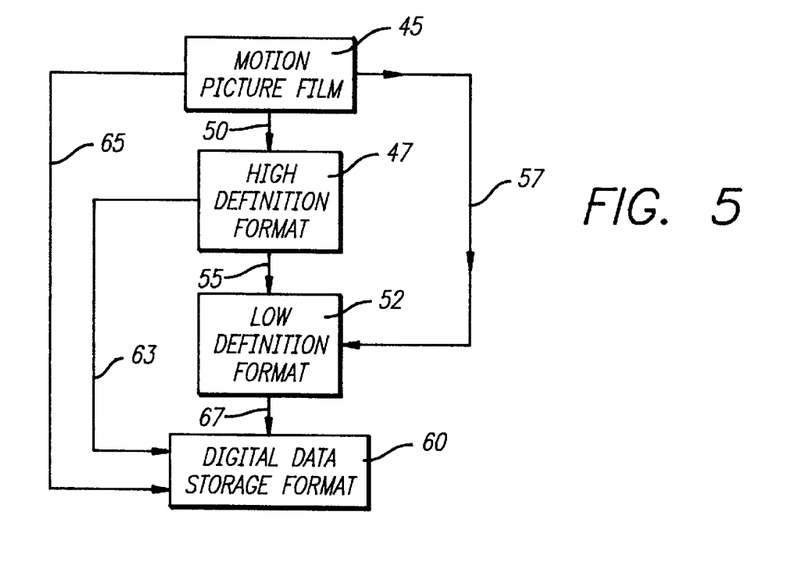
FIG. 5 is a graphical illustration of possible format conversions that may occur in the performance of a method embodying the invention.

The visual format conversions that may be performed in telecine are illustrated graphically in FIG. 5. According to the invention, visual images are transferred from motion picture film 45 (usually the developed negative but occasionally workprint) into a high definition video storage format 47 as indicated by arrow 50. The visual images are also converted to a low definition video storage format 52. The images may be transferred to the low definition format either from the high definition format as indicated by arrow 55, or directly from film as indicated by arrow 57. The low definition video storage format is used primarily because most of the presently available digital nonlinear motion picture editing systems are adapted to accept video input in the form of an NTSC compatible or similar format.

Finally, visual images are converted into a digital data storage format 60 adapted for use with digital nonlinear motion picture editing equipment. The visual images may be converted into the digital data storage format from the high definition video storage format as indicated by arrow 63, or directly from film as indicated by arrow 65. Most commonly, though, the visual images will be converted into the digital data storage format from an NTSC compatible or similar low definition format as indicated by arrow 67. Again, these transfers may occur simultaneously or in any sequence compatible with the equipment being used and the logistics in specific productions.

Because most presently available digital nonlinear motion picture editing equipment is adapted to accept input in an NTSC compatible or a similar video format, it is anticipated that the conversion of visual images to the digital data storage format 60 will most typically occur as indicated by arrow 67, at least initially. It is anticipated, however, that one or more high definition video storage formats will become increasingly dominant in the near future. As this occurs, the newer high definition format may largely supplant the currently popular formats. In this case, it may become increasingly common to use digital nonlinear motion picture editing equipment adapted to accept high definition video input, and this type of conversion is indicated by arrow 63. As electronic film editing continues to develop, it may become possible or even common to transfer visual images directly or through one or more intervening steps from film to the digital data storage format adapted for use with digital nonlinear motion picture editing equipment, and this type of conversion is indicated by arrow 65.

At the end of telecine, the visual images from the film exist in several different formats. The original negative and sound masters are archived for later use. The high definition video format will be available for big-screen projection as dailies as indicated by the block labeled "dailies screening" 70 in FIG. 4, and will then be archived for later use in constructing interim versions of the work in progress for exhibition to preview audiences. The low definition format is retained for future screening at venues that lack high definition equipment and as a backup for restoring files of the digital database in case they become damaged. Finally, the images are stored in the digital data storage format adapted for use with the digital nonlinear motion picture editing equipment.

Referring once again to FIG. 4, the process moves from high definition telecine 43 to the editing room 72. In the editing room, the editor uses the digital nonlinear motion picture editing equipment in the conventional manner to edit the motion picture. The editor typically works with the director, one or more assistant editors, and perhaps others to make the creative decisions involved in editing and assembling the motion picture.

At some point in the editing process, the filmmakers become satisfied that the work is ready for exhibition to a preview audience. At this point, information is prepared to assist in conforming the images previously converted and stored on the high definition format to the version of the work stored in the digital nonlinear editing equipment. Most often, an NTSC output tape is made from the nonlinear editing equipment for use as a visual reference, and one or more interim edit decision lists are generated from information stored in the editing equipment. Meanwhile, edited sound is output to digital audiotape or another medium. The editor or his assistants then use the interim edit decision lists and, when available, the visual reference to prepare a high definition preview tape by conforming the previously stored high definition images and recorded sound onto high definition edit master videotape. This step is indicated by the block labeled "high definition conformation" 75 in FIG. 4.

This process is quicker, more convenient, and much less expensive than cutting and splicing film, as was formerly necessary for the production of preview versions of the work in progress. The process produces an interim copy of the motion picture stored in the high definition video format. This interim copy is then available for "preview screening" 78 as shown in FIG. 4. If desired, multiple copies can be made from the interim copy and shipped for preview exhibitions at any number of locations. Although the high definition format still cannot match the resolution of film, it is far superior to low definition formats like NTSC and more than adequate for big screen projection to preview audiences.

The high definition interim version may be exhibited to a preview audience using high definition video projection equipment or any other suitable viewing equipment. As used in this document, the term "preview audience" refers to one or more persons to whom the motion picture is exhibited, in whole or in any part, before the film is finalized, and whose reaction may be relied upon as a factor in editing and assembling the final version of the film. The reaction of the preview audience may be observed and assessed in any desired manner as indicated by the block labeled "audience reaction" 80 in FIG. 4. This reaction is then available to the filmmakers for use as a factor in their judgments regarding further revisions to the work. The term "preview audience" encompasses an audience of one or more people viewing a dailies screening since the reaction of the audience, even if it is only the director, to the dailies screening will be relied on at least in part in editing and assembling the final version of the film. "Preview audience" also encompasses a specially assembled preview audience to whom the film is exhibited and whose reactions are studied and taken into account in editing and finalizing the film.

After any given preview screening, the filmmakers may decide that no further revisions are necessary and the film is ready for release. More often, the filmmakers will edit the film further. The filmmakers will in many cases prepare another interim version for a second preview. After more work using the nonlinear motion picture editing equipment, new edit decision lists are prepared to reflect the new work. The second preview is conformed to the new edit decision lists as before on high definition videotape. The second preview is then exhibited to the same or a different preview audience, and the reaction of this audience is observed and assessed once again. This cycle—editing the work, preparing and exhibiting a preview version, observing and assessing the reaction of the preview audience, and further revising the film—may continue through any number of iterations.

Eventually, however, the filmmakers must decide that they have achieved the best possible product given the time, budget, and film footage that they have available. At this point the film is "locked" and no further changes are allowed. After all or part of the film is locked, which may occur on a reel by reel basis, the filmmakers generate final editing information 83 for use in preparing the final version of the film. Generally, this information is produced reel by reel in the form of final NTSC output tapes from the nonlinear editing equipment and one or more final edit decision lists for picture and sound. In "final negative conformation" 85, a person called the "negative cutter" take the final editing information and cuts and splices the original film negative into a final "cut negative" that reflects all of the creative decisions made by the filmmakers in the editing process. The final edit decision list used for final negative conformation is also referred to as a "negative cutting list." The post-production sound department then uses the sound edit decision list and a copy of the cut track to prepare a final audio "dub." The cut negative and final dub are used as before to print a master positive, which is then used to generate multiple negative copies from which release print copies of the film are made for eventual distribution and release.

Methods embodying the invention may optionally include processes and apparatus to convert between the differing aspect ratios used by the various storage media. As noted above, the term "aspect ratio" refers to the ratio of the display width to the display height. One high definition video storage medium that appears to be gaining in popularity has an aspect ratio that is commonly referred to as "16×9" (about 1.78:1). NTSC compatible formats, in contrast, use an aspect ratio of about 1.33:1. Finally, motion pictures for theatrical exhibition in the United States typically use an aspect ratio of either 1.85:1 or 2.35:1, while European exhibitors usually use an aspect ratio of 1.66:1.

Figure 6:
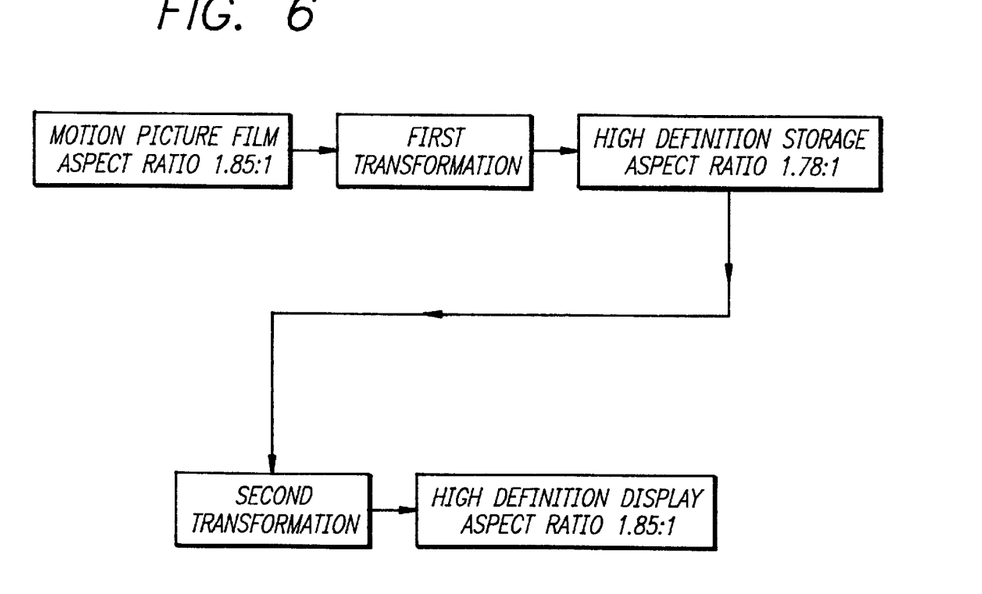
FIG. 6 is a symbolic illustration of steps involved in a process for anamorphically converting visual images between different image aspect ratios that may be encountered in methods embodying the invention.

Motion pictures for the U.S. market are usually composed for an aspect ratio of 1.85:1. The other aspect ratio most commonly used in the United States, 2.35:1, is achieved by "squeezing" the image through a special "anamorphic" lens when the film is shot, and "unsqueezing" the image through a reverse anamorphic lens when the film is projected. When this invention is used, images having a first aspect ratio of 1.85:1 may be transferred from film negative or workprint to a high definition video storage medium, which may have a second aspect ratio of about 1.78:1 ("16×9"). In this case, signals carrying images from the film may be transformed electronically to conform to and make full use of the 16×9 storage and display area of the high definition video storage medium. When the high definition video images are displayed, whether for dailies screening or for a special preview exhibition, the signals carrying the images will be once again transformed electronically, or the images will be projected through an appropriate anamorphic projection lens to "unsqueeze" the images optically and convert them back to their original, intended aspect ratio. These steps are depicted symbolically in FIG. 6.

The present invention thus provides novel methods for editing motion pictures. Although the invention has been described with reference to presently preferred embodiments, it should be understood that various modifications can be made without departing from the spirit or scope of the invention. Moreover, the invention is defined only by the following claims, along with the full scope of equivalents to which those claims are legally entitled.

What is claimed is:

1. A method for editing motion pictures, the method comprising:

transferring visual images from motion picture film to a high definition video storage medium;

transferring the visual images from at least one of the group consisting of the motion picture film and the high definition video storage medium to a digital data storage format adapted for use with digital nonlinear motion picture editing equipment;

after the visual images have been transferred to the digital data storage format, using the digital nonlinear motion picture editing equipment to generate an edit decision list;

conforming the visual images that have been transferred to the high definition video storage medium to the edit decision list for preview screening on a big theater-like screen that simulates cinema resolution and picture quality;

using the digital nonlinear motion picture editing equipment to generate a negative cutting list based on audience reaction to the preview screening; and conforming the motion picture film to the negative cutting list.

2. The method of claim 1, and wherein the high definition video storage medium is adapted to store visual images having at least 550 horizontal lines.

3. The method of claim 2, and wherein the high definition video storage medium is adapted to store visual images having at least 800 horizontal lines.

4. The method of claim 3, and wherein the high definition video storage medium is adapted to store images having at least 1000 horizontal lines.

5. The method of claim 1, and wherein the digital data storage format is adapted for storage on at least one high-capacity magnetic disk drive adapted for use with the digital nonlinear motion picture editing equipment.

6. The method of claim 1, and wherein transferring the visual images from at least one of the group consisting of the motion picture film and the high definition video storage medium to a digital data storage format adapted for use with the digital nonlinear motion picture editing equipment includes:
   transferring the visual images from at least one of the group consisting of the motion picture film and the high definition video storage medium to a low definition video storage medium; and
   transferring the visual images from the low definition video storage medium to a digital storage format adapted for use with the digital nonlinear motion picture editing equipment.

7. The method of claim 1, and further comprising:
   before the motion picture film is conformed to the negative cutting list, using the digital nonlinear motion picture editing equipment to generate a further edit decision list;
   conforming the visual images stored on the high definition video storage medium to the further edit decision list for further preview screening on a big theater-like screen that simulates cinema resolution and picture quality; and
   using the digital nonlinear motion picture editing equipment to generate the negative cutting list based on the further preview screening.

8. The method of claim 1, and further comprising:
   transforming the aspect ratio of the visual images from a first aspect ratio to a second aspect ratio as the visual images are transferred from the motion picture film to the high definition video storage medium;
   transforming the aspect ratio of the visual images from the second aspect ratio back to the first aspect ratio; and
   displaying the transformed visual images from the high definition video storage medium in the first aspect ratio.

9. The method of claim 8, and wherein transforming the aspect ratio of the visual images from the first aspect ratio to the second aspect ratio includes transforming the aspect ratio of the visual images electronically.

10. The method of claim 8, and wherein transforming the aspect ratio of the visual images from the second aspect ratio back to the first aspect ratio includes transforming the aspect ratio of the visual images optically.

11. The method of claim 10, and wherein transforming the aspect ratio of the visual images optically includes projecting the visual images through a reverse anamorphic projection lens.

12. A method for editing motion pictures, the method comprising:
   transferring visual images from motion picture film to a high definition video storage medium;
   transferring the visual images from at least one of the group consisting of the motion picture film and the high definition video storage medium to a digital data storage format adapted for use with digital nonlinear motion picture editing equipment;
   using the digital nonlinear motion picture editing equipment to edit the visual images stored in the digital data storage format and to generate an edit decision list;
   conforming the visual images that have been transferred to the high definition video storage medium to the edit decision list;
   displaying the visual images that have been transferred to the high definition video storage medium and conformed to the edit decision list on a big theater-like screen that simulates cinema resolution and picture quality to an audience for preview screening;
   evaluating audience reaction to the preview screening;
   using the digital nonlinear motion picture editing equipment to edit the visual images stored in the digital data storage format and to generate a negative cutting list based on evaluation of the audience reaction to the preview screening; and
   conforming the motion picture film to the negative cutting list.

13. The method of claim 12, further comprising:
   using the digital nonlinear motion picture editing equipment to edit the visual images stored in the digital data storage format and to generate a further edit decision list based on evaluation of audience reaction to the preview screening;
   conforming the visual images that have been transferred to the high definition video storage medium to the further edit decision list;
   displaying the visual images that have been transferred to the high definition video storage medium and conformed to the further edit decision list on a big theater-like screen that simulates cinema resolution and picture quality to an audience for further preview screening;
   evaluating audience reaction to the further preview screening;
   using the digital nonlinear motion picture editing equipment to edit the visual images stored in the digital data storage format and to generate a negative cutting list based on evaluation of audience reaction to the further preview screening; and
   conforming the motion picture film to the negative cutting list.

14. The method of claim 12, further comprising:
   transferring the visual images from at least one of the group consisting of the motion picture film and the high definition video storage medium to a low definition video storage medium; and
   transferring the visual images from at least one of the group consisting of the motion picture film, the high definition video storage medium and the low definition video storage medium to a digital data storage format adapted for use with digital nonlinear motion picture editing equipment.

15. The method of claim 12, further comprising:
   displaying the visual images that have been transferred to the high definition video storage medium for viewing as dailies on a big theater-like screen that simulates cinema resolution and picture quality; and
   storing the dailies for later conformation to the edit decision list.

16. A method for editing motion pictures, the method comprising:
   transferring visual images from motion picture film to a high definition video storage medium;
   transferring the visual images from at least one of the group consisting of the motion picture film and the high definition video storage medium to a low definition video storage medium;
   transferring the visual images from at least one of the group consisting of the motion picture film, the high definition video storage medium and the low definition video storage medium to a digital data storage format adapted for use with digital nonlinear motion picture editing equipment;

using the digital nonlinear motion picture editing equipment to edit the visual images stored in the digital data storage format and to generate a first edit decision list;

conforming the visual images that have been transferred to the high definition video storage medium to the first edit decision list;

displaying the visual images that have been transferred to the high definition video storage medium and conformed to the first edit decision list on a big theater-like screen that simulates cinema resolution and picture quality to an audience for preview screening;

evaluating audience reaction to the preview screening;

using the digital nonlinear motion picture editing equipment to edit the visual images stored in the digital data storage format and to generate a second edit decision list based on evaluation of the audience reaction to the preview screening; and conforming the motion picture film to the second edit decision list.

* * * * *

US005841512C1

(12) EX PARTE REEXAMINATION CERTIFICATE (9347th)
United States Patent  (10) Number: US 5,841,512 C1
Goodhill  (45) Certificate Issued: Oct. 8, 2012

(54) METHODS OF PREVIEWING AND EDITING MOTION PICTURES (75) Inventor: Dean Kenneth Goodhill, Los Angeles, CA (US)

(73) Assignee: Digital Dailies & Previews, LLC, Los Angeles, CA (US)

Reexamination Request:
No. 90/009,092, Mar. 25, 2008
No. 90/007,996, Apr. 5, 2006

Reexamination Certificate for:
Patent No.: 5,841,512
Issued: Nov. 24, 1998
Appl. No.: 08/607,791
Filed: Feb. 27, 1996

(51) Int. Cl.
*G11B 27/02* (2006.01)
*G11B 27/034* (2006.01)
*G11B 27/028* (2006.01)
*G11B 27/031* (2006.01)
*G11B 27/022* (2006.01)
*G11B 27/06* (2006.01)
*G03B 31/00* (2006.01)

(52) U.S. Cl. .... 352/56; 348/441; 352/129; G9B/27.004; G9B/27.008; G9B/27.01; G9B/27.012

(58) Field of Classification Search .................... None
See application file for complete search history.

(56) References Cited

To view the complete listing of prior art documents cited during the proceedings for Reexamination Control Numbers 90/009,092 and 90/007,996, please refer to the USPTO's public Patent Application Information Retrieval (PAIR) system under the Display References tab.

*Primary Examiner* — Ovidio Escalante (57) ABSTRACT

The invention provides improved methods for editing film into motion pictures. Visual images are transferred from developed motion picture film to a high definition video storage medium, which is a storage medium adapted to store images and to display images in conjunction with display equipment having a scan density substantially greater than that of an NTSC compatible video storage medium and associated display equipment. The visual images are also transferred, either from the motion picture film or the high definition video storage medium to a digital data storage format adapted for use with digital nonlinear motion picture editing equipment. After the visual images have been transferred to the high definition video storage medium, the digital nonlinear motion picture editing equipment is used to generate an edit decision list, to which the motion picture film is then conformed. The high definition video storage medium will be adapted to store and display visual images having a scan density of at least 550 horizontal line, preferably at least 800 horizontal lines, and most preferably 1000 horizontal lines. Electronic or optical transformations may be utilized to allow use of visual aspect ratios that make full use of the storage formats used in the method.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-16 are cancelled.

* * * * *